US009746014B1

(12) United States Patent
Cassaro

(10) Patent No.: US 9,746,014 B1
(45) Date of Patent: Aug. 29, 2017

(54) STRUT RETENTION DEVICE

(71) Applicant: Nicholas C. Cassaro, Laveen, AZ (US)

(72) Inventor: Nicholas C. Cassaro, Laveen, AZ (US)

( * ) Notice: Subject to any disclaimer, the term of this patent is extended or adjusted under 35 U.S.C. 154(b) by 412 days.

(21) Appl. No.: 14/530,731

(22) Filed: Nov. 1, 2014

Related U.S. Application Data

(60) Provisional application No. 61/927,476, filed on Jan. 15, 2014.

(51) Int. Cl.
*E05C 17/30* (2006.01)
*F16B 7/14* (2006.01)
*E05F 1/10* (2006.01)

(52) U.S. Cl.
CPC ................ *F16B 7/14* (2013.01); *E05C 17/30* (2013.01); *E05F 1/1091* (2013.01)

(58) Field of Classification Search
CPC .......... E05C 17/30; E05F 1/10; E05F 1/1091; E05F 3/02; E05F 3/108; E05F 3/221; F16F 9/0254
See application file for complete search history.

(56) References Cited

U.S. PATENT DOCUMENTS

| | | | | |
|---|---|---|---|---|
| 4,744,548 A * | 5/1988 | Hathaway | E05C 17/30 | 188/300 |
| 4,813,100 A * | 3/1989 | King | E05C 17/30 | 16/49 |
| 4,890,703 A * | 1/1990 | Hathaway | F16F 9/0254 | 188/300 |
| 5,358,225 A * | 10/1994 | Volpel | E05C 17/305 | 16/82 |
| 5,575,513 A * | 11/1996 | Tuttle | E05C 17/30 | 16/82 |
| 6,273,405 B2 * | 8/2001 | Okamoto | F16F 9/0254 | 188/300 |
| 7,735,810 B2 * | 6/2010 | Pope | B62D 25/12 | 188/300 |
| 7,887,031 B2 * | 2/2011 | Murota | F16F 9/0254 | 188/300 |
| 8,474,796 B2 | 7/2013 | Spence, Jr. | | |
| 9,032,587 B2 * | 5/2015 | Adoline | E05F 1/10 | 16/49 |
| 9,109,387 B2 * | 8/2015 | Oosawa | F16F 9/0254 | |
| 9,121,467 B2 * | 9/2015 | Born | F16F 9/0254 | |
| 2008/0016925 A1 | 1/2008 | Hawkinberry | | |
| 2009/0096140 A1 * | 4/2009 | Asa | F16F 9/0254 | 267/124 |

* cited by examiner

*Primary Examiner* — Daniel Wiley
(74) *Attorney, Agent, or Firm* — Thomas W. Galvani, P.C.; Thomas W. Galvani

(57) ABSTRACT

A device for retaining a strut that moves between a retracted position and an extended position includes a body arrangeable in a storage condition of the body and a retention condition of the body. In the retention condition, the strut is prevented from moving from the extended position to the retracted position thereof. The body moves from the storage condition to the retention condition in response to extension of the strut.

13 Claims, 8 Drawing Sheets

STRUT RETENTION DEVICE

CROSS-REFERENCE TO RELATED APPLICATIONS

This application claims the benefit of U.S. Provisional Application No. 61/927,476, filed Jan. 15, 2014, which is hereby incorporated by reference.

FIELD OF THE INVENTION

The present invention relates generally to safety equipment, and more particularly to mechanical supports for retaining struts.

BACKGROUND OF THE INVENTION

Struts are devices which provide mechanical assistance when raising, lowering, moving, and holding objects. Struts are elongated devices having a hydraulic or pneumatic cylinder and a rod which slides within the cylinder. The rod is generally fixed to a piston or other sealing device within the cylinder, which drives against a dampening medium, such as a gas or oil. The dampening medium is contained within the cylinder by a seal; generally, the seal between the cylinder and the rod is a gasket or O-ring.

Often, the seal between the rod and cylinder will wear out, causing the gas or oil in the cylinder to slowly leak out. When this happens, the strut becomes less effective at providing mechanical assistance. The strut will raise the object slower, or not at all, or will fail to keep an object elevated, or will lower an object too quickly. This problem is exaggerated when the operating temperature of the strut is low, because a drop in temperature will cause a drop in the pressure inside the cylinder on which the strut relies to operate properly. The strut eventually ceases to operate, and some other device must replace the strut.

As an example, struts are used in the automotive industry, in one instance, to hold up hoods, hatches, and liftgates of automobiles. A hood strut will hold the hood of an automobile open when a user is under the hood inspecting the engine compartment. When the hood is up, the strut is extended and generally keeps the hood open. Hoods can be quite heavy, and so a strut required to keep the hood open must both be strong and have good seals. As the seals begin to fail with time, the strut will become less effective at opening the hood and keeping the hood open. A user may have to lift the hood with more force, may have to hold the hood up with his arm, or eventually, may have to prop the hood open with another object, such as a pole, a broom stick, or the like. This poses a danger; should the propping device come loose, the hood could come crashing down, possibly on the user. An improved device for holding a strut in an extended position is needed.

SUMMARY OF THE INVENTION

A strut retention device includes a body which moves from a storage condition to a retention condition in response to movement of a strut from a retracted position to an extended position. In the storage condition, the body receives the strut. In the retention condition, the body prevents the strut from moving from the extended position to the retracted position, thereby providing a safe support to prevent accidental collapse of the strut.

BRIEF DESCRIPTION OF THE DRAWINGS

Referring to the drawings.

DETAILED DESCRIPTION

Figure 1A:
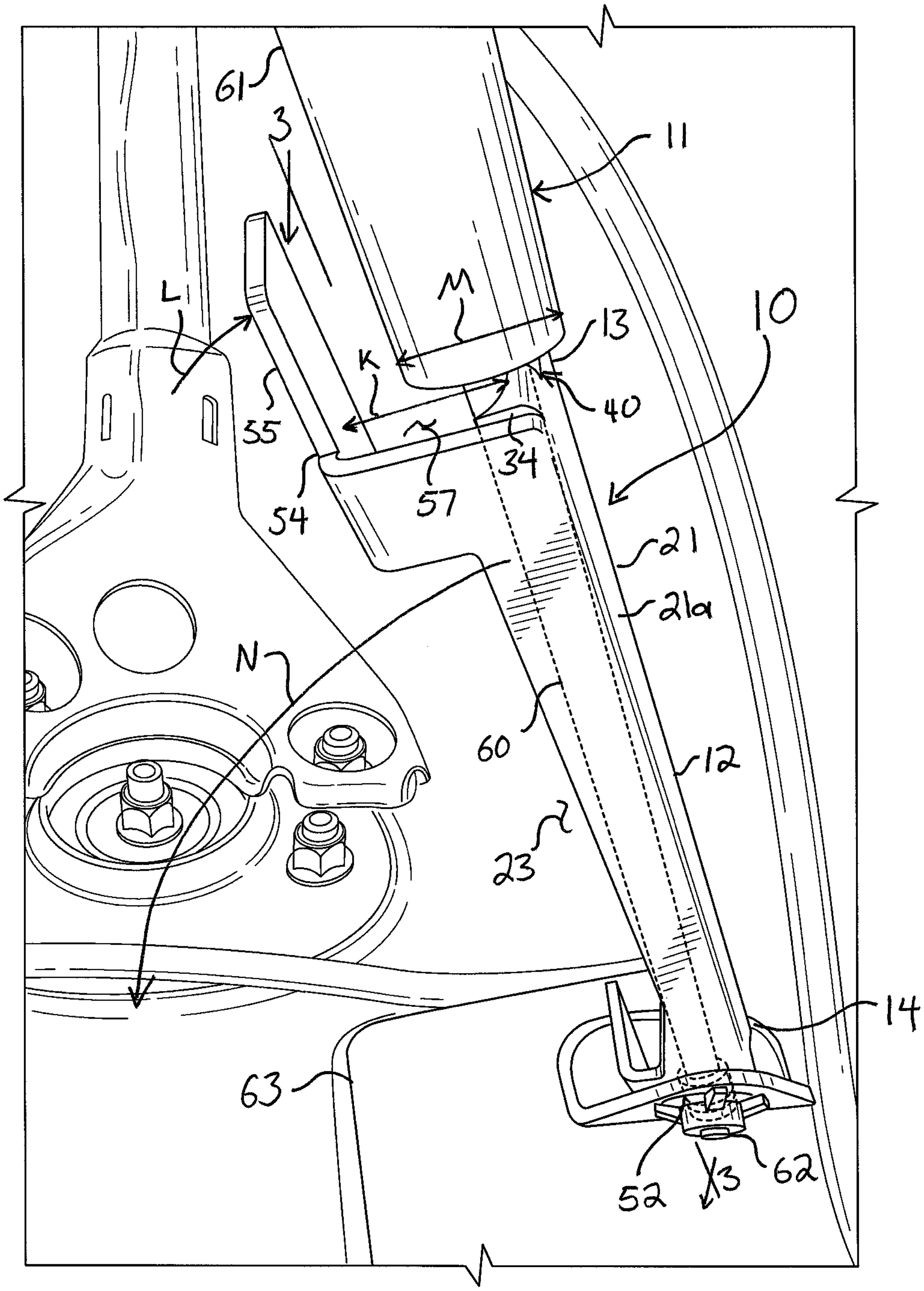
FIG. 1A is a side perspective view of a strut retention device applied to a strut inside an engine compartment of an automobile, illustrating the strut in an extended position and the strut retention device in a retention condition.
Figure 1B:
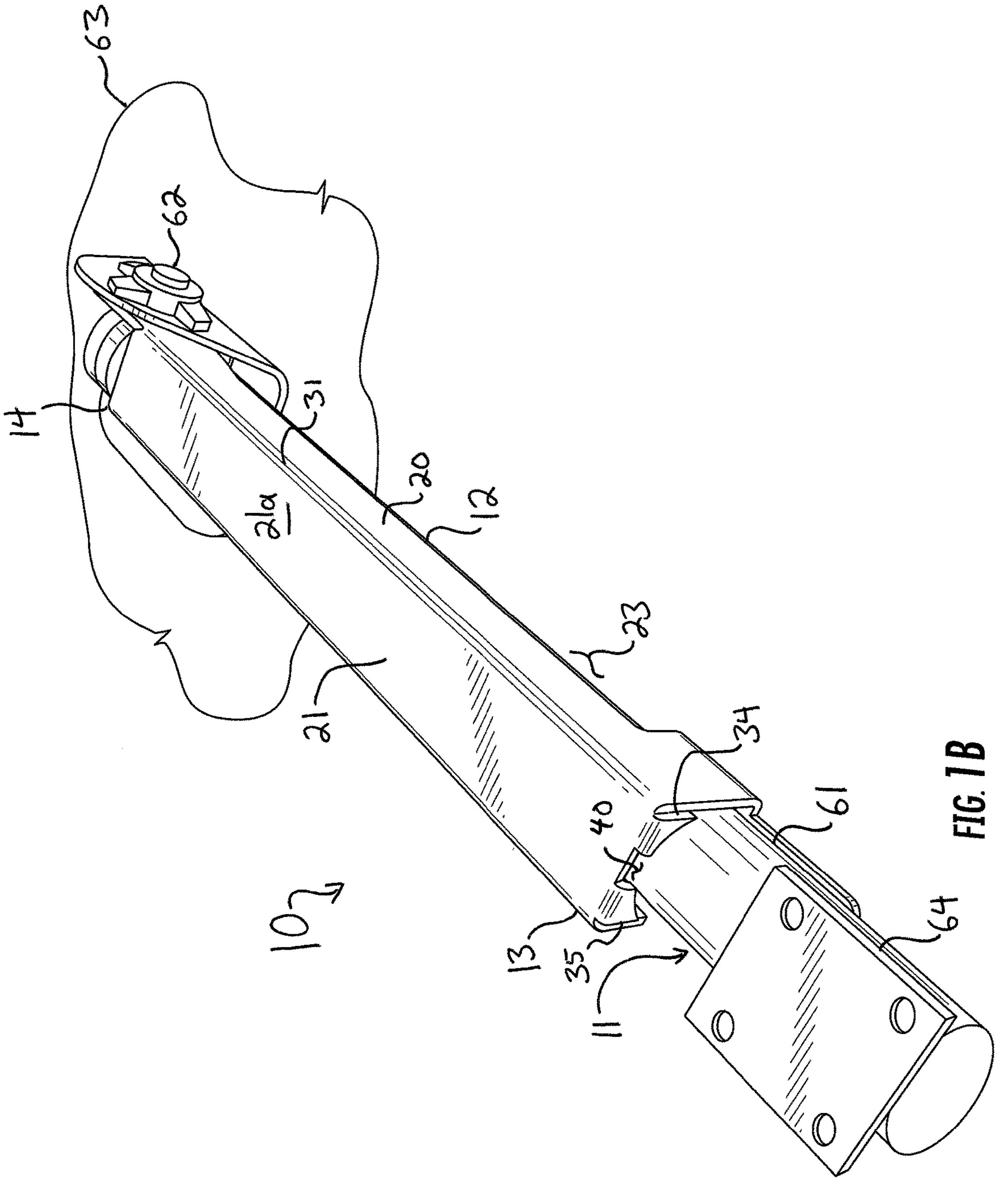
FIG. 1B is a top perspective view of the strut retention device of FIG. 1A applied to the strut inside the engine compartment, illustrating the strut in a retracted position and the strut retention device in a storage condition.

Reference now is made to the drawings, in which the same reference characters are used throughout the different figures to designate the same elements. FIG. 1A illustrates a strut retention device 10 useful for retaining a strut 11 in an extended position of the strut 11, and for receiving the strut 11 in a retracted position of the strut 11. FIG. 1A displays the strut retention device 10 (hereinafter, "device 10") installed in the engine compartment of a motor vehicle and applied to a strut 11 which is in the extended position thereof and is supporting the hood of the motor vehicle. FIG. 1B displays the device 10 applied to the strut 11 while the strut 11 is in the retracted position. The device 10 includes an elongate body 12 extending between opposed proximal and distal ends 13 and 14, respectively. The device 10 is preferably constructed from a material or combination of materials having material characteristics of high rigidity, high durability, and high compressive strength, such as metal. The device 10 is preferably formed from a single sheet of metal and bent into the form shown throughout the various FIGS.

Figure 2A:
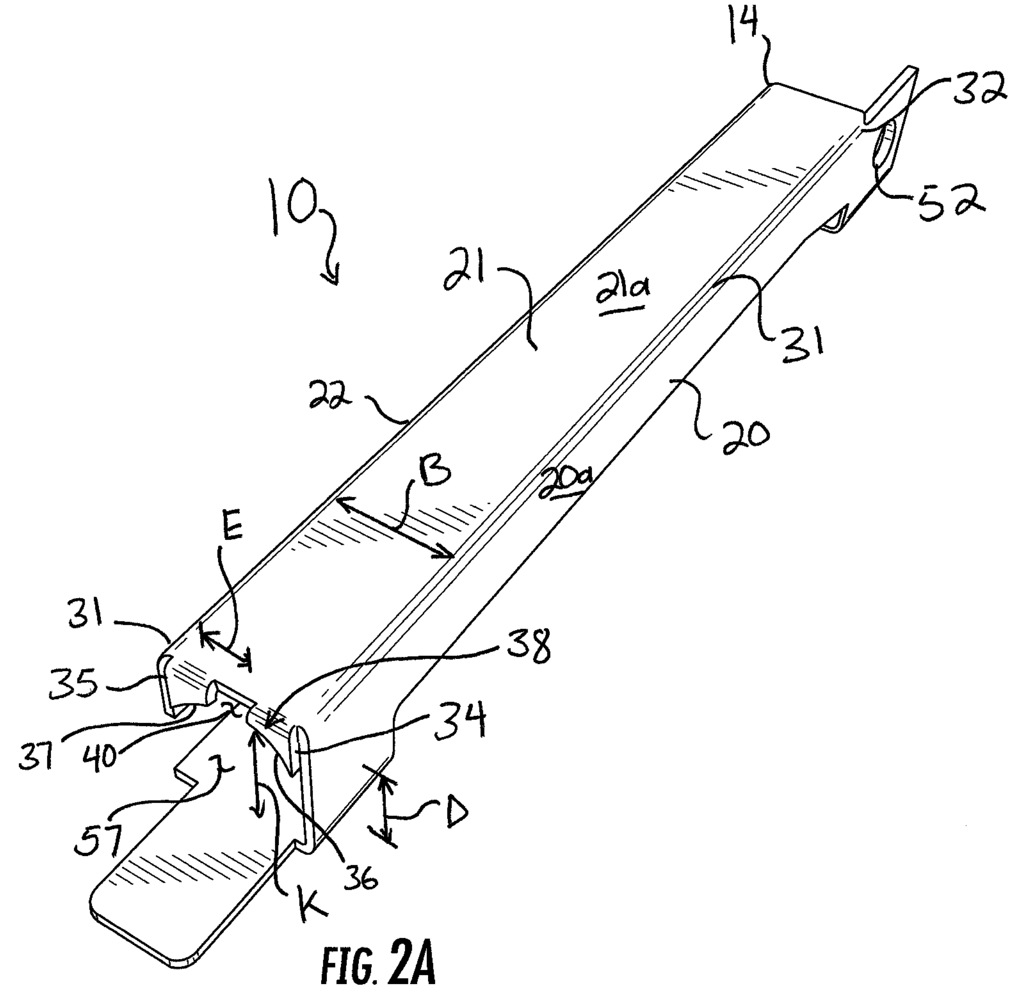
FIGS. 2A, 2B, 2C, and 2D are top, left, bottom, and right perspective views, respectively, of the strut retention device of FIG. 1A.
Figure 2B:
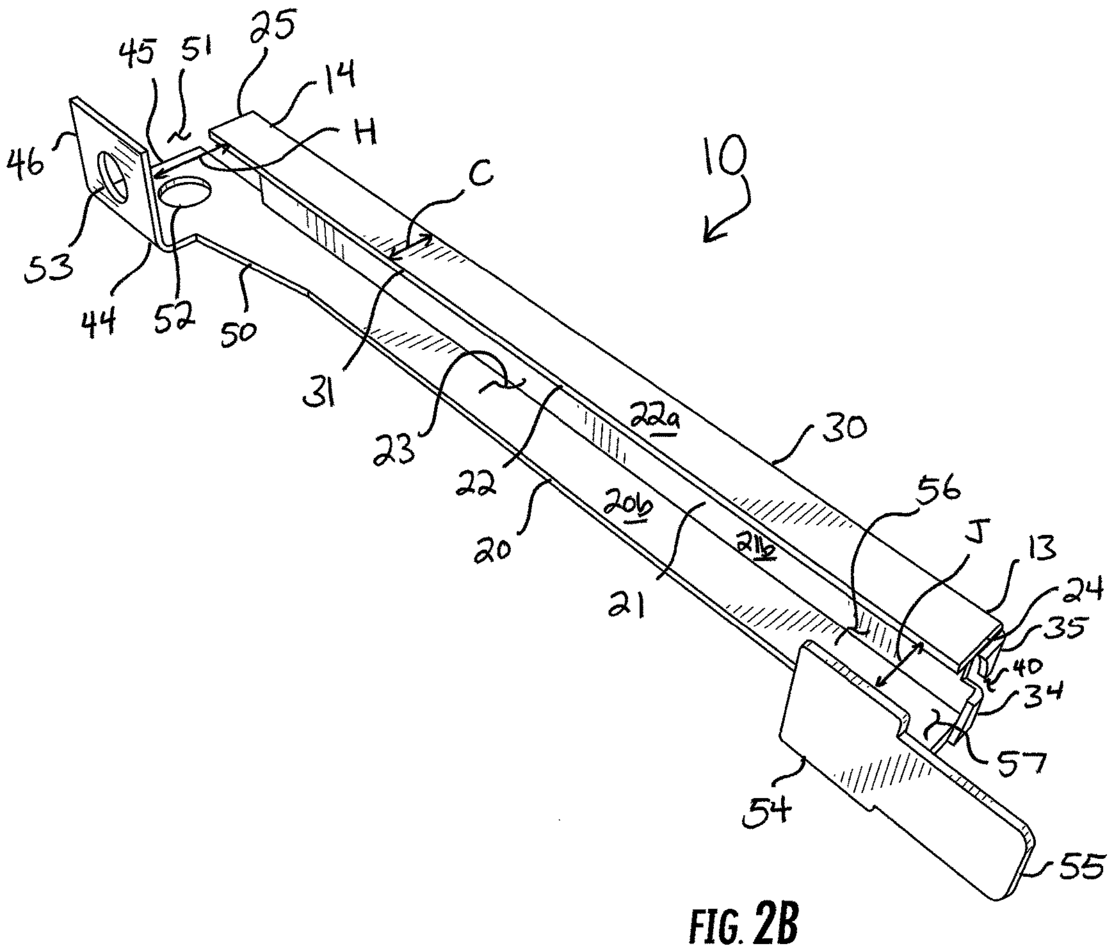
Figure 2C:
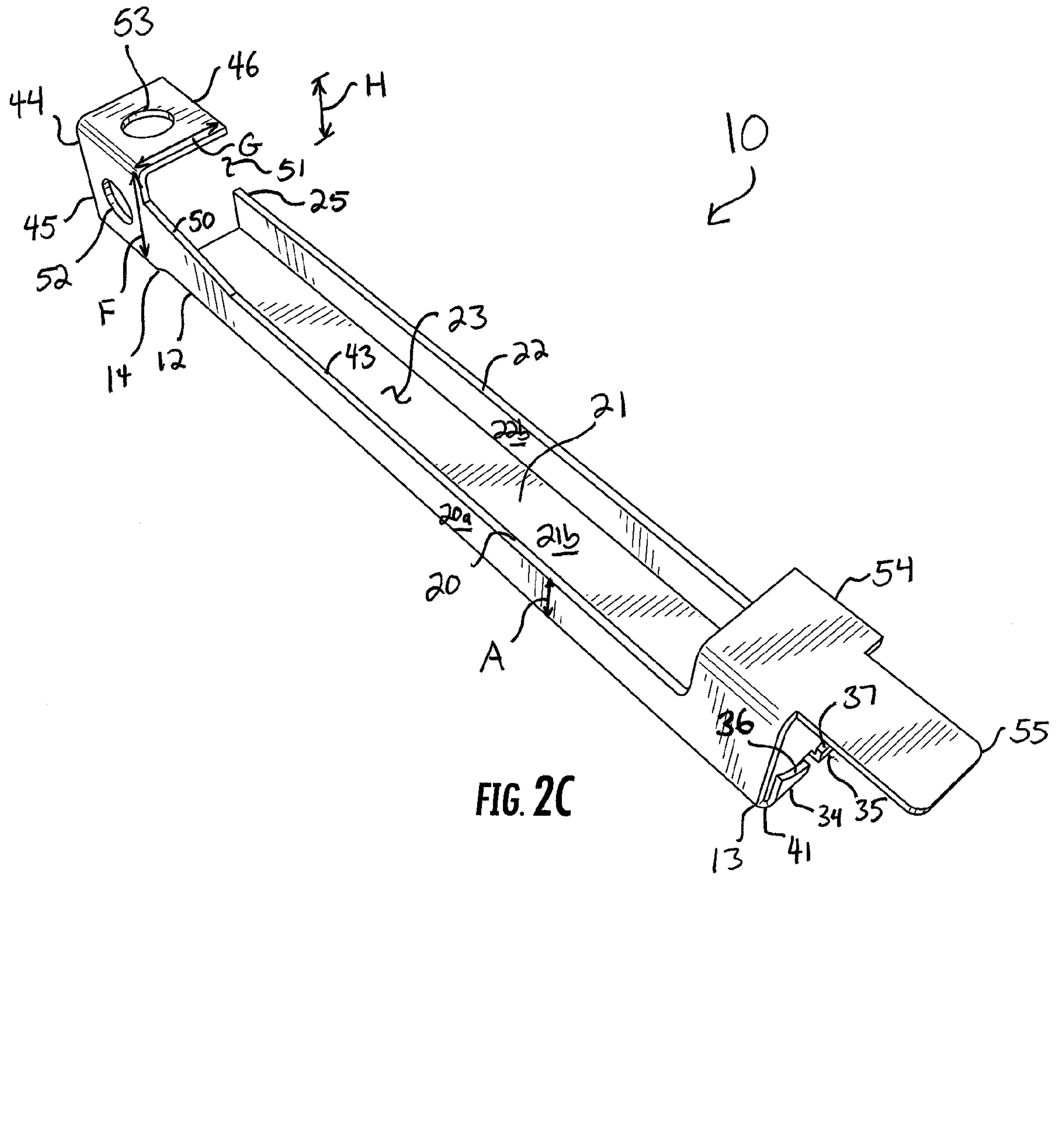
Figure 2D:
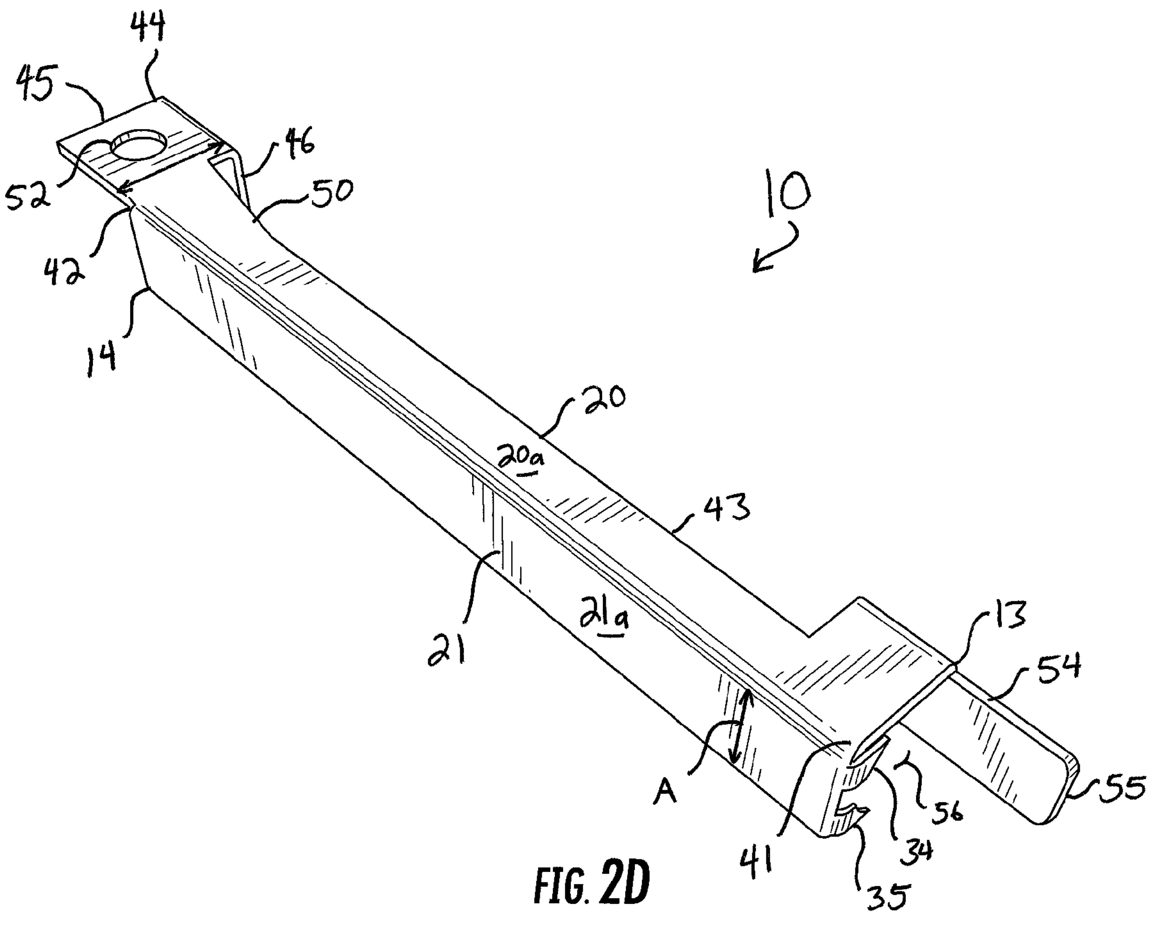

Referring to FIGS. 2A-2D, the body 12 of the strut 11 is defined by three elongate, generally rectangular spans 20, 21, and 22. FIGS. 2A-2D each show a different perspective of the device 10, for ease of explanation each of which is described as such: FIG. 2A is a top perspective view, FIG. 2B is a left perspective view, FIG. 2C is a bottom perspective view, and FIG. 2D is a right perspective view. As such, and again, for purposes only of clarity of description, the span 20 is considered a right span 20, the span 21 is considered a top span 21, and the span 22 is considered a left span 22, as each span is easily visible from a corresponding perspective view. The right, top, and left spans 20, 21, and 22 each have outer faces 20*a*, 21*a*, and 22*a*, respectively, and each have inner faces 20*b*, 21*b*, and 22*b*, respectively. The inner faces 20*b*, 21*b*, and 22*b* cooperate to bound and define a generally rectangular prismatic receiving space 23 within the device 10 extending from the proximal end 13 to the distal end 14.

The left span 22, shown clearly in FIG. 2B, is generally rectangular and has opposed ends 24 and 25 located proximate to the proximal and distal ends 13 and 14, respectively. The left span 22 is integrally formed to the top span 21 along a long corner 30 and has a height C extending between the corner 30 and an edge 31. The height C of the left span 22 is constant between the ends 24 and 25.

The top span 21, shown clearly in FIG. 2A, is generally rectangular and has opposed ends 31 and 32 located proximate to the proximal and distal ends 13 and 14, respectively, of the device 10. The top span 21 is integrally formed to the right span 20 along a long corner 31. The top span 21 thus has two corners 30 and 31 shared with the left and right spans 22 and 20, respectively. The top span 21 has a width B extending between the corners 30 and 31, which is constant between the ends 31 and 32 of the top span 21.

Two extensions, or teeth 34 and 35, are integrally formed to the end 31 of the top span 21. The teeth 34 and 35 are rectangular projections turned inwardly into the receiving space 23, thus bounding the receiving space 23 at the proximal end 13 of the device 10. The tooth 34 is proximate to the right span 20 and is considered a right tooth 34. Likewise, the tooth 35 is proximate to the left span 22 and is considered a left tooth 34. The right and left tooth each have a full height D, shown in FIG. 2A, which extends from the outer face 21*a* of the top span 21 into the receiving space 23. The height D of each tooth 34 and 35 is less than the height C of the left span 22, as shown in FIG. 2B. The teeth 34 and 35 each have contact faces 36 and 37, respectively, which are arcuate and cooperate to define an arc of a circle. The contact face 36 of the tooth 34 arcuately curves inwardly, toward the top span 21, from proximate to the right span 20 toward the left span 22. Similarly, the contact face 37 of the tooth 35 arcuately curves inwardly, toward the top span 21, from proximate to the left span 22 toward the right span 20. The contact faces 36 and 37 are smooth. The teeth 34 and 35 are separated by a rectangular gap 40 having a width E, shown in FIG. 2A. The gap thus severs the arc of the circle cooperatively defined by the contact faces 36 and 37. The teeth 34 and 35, together with the gap 40, cooperate to form a catch 38 for catching and holding the strut 11. The catch 38 is curved to correspond in shape and size to the strut 11.

The right span 20, shown clearly in FIGS. 2C and 2D, is elongate and formed with additional engagement elements at opposed ends 41 and 42, which ends 41 and 42 are located proximate to the proximal and distal ends 13 and 14, respectively, of the device 10. The right span 20 is integrally formed to the top span 21 along the corner 31, as described above. The right span 20 has a height A extending from the corner 31 to an edge 43. The height A is constant along substantially the entire length of the right span 20 between the ends 41 and 42.

A bracket 44 is provided at the end 42 and is structured to mount the device 10 at an installation. The bracket 44 includes a first extension 45 projecting from the right span 20, and a second extension 46 projecting from the first extension 45. The first extension 45 is a generally square projection of the right span 20 and is contiguous to and coplanar with the right span 20. The first extension 45 has a height F which is approximately twice the height A of the right span 20. The right span 20, proximate to the end 42, increases in height from the height A to transition partially to the height F of the first extension 45, thus forming a diagonal shoulder 50 at the end 42 of the right span 20. The shoulder 50 provides rigidity and structural support to the first extension 45.

The second extension 46 projects laterally from the first extension, so that the second extension 46 extends over the receiving space 23 from the first extension toward the left span 22. In this way, the second extension 46 bounds and defines the receiving space 23 opposite from the top span 21 at the distal end 14 of the device 10. The second extension 46 has a width G which is substantially equal to the width B of the top span 21 (as the width B is shown in FIG. 2A), so that the second extension 46 extends substantially flush with the left span 22. The second extension 46 is transverse to the first extension 45, and is transverse to the left span 22, so as to define a gap 51 between the second extension 46 and the left span 22 proximate to the end 25 of the second span 22. This gap 51 has a height H which is equal to the height C of the left span 22 subtracted from the height F of the first extension 45.

The first and second extensions 45 and 46 both have holes 52 and 53, respectively, formed therethrough. The hole 52 is a continuous hole formed at a generally intermediate and central location on the first extension 45, and the hole 53, similarly, is a continuous hole formed at a generally intermediate and central location on the second extension 46. Each of the holes 52 and 53 is sized to receive a post so as to mount the device 10 at an installation, as will soon be described.

Turning to the other end 41 of the device 10, but with reference still to FIGS. 2C and 2D, a tab 54 is provided at the end 41. The tab 54 is a projection extending laterally over the receiving space 23 from the end 41. In this way, the tab 54 bounds and defines the receiving space 23 opposite from the top span 21 at the proximal end 13 of the device 10. The tab 54 defines a gap 56 (shown in FIG. 2D but most easily seen in FIG. 2B) between the tab 54 and the left span 22 proximate to the end 24 of the second span 22. This gap 56 has a height J (shown only in FIG. 2B) which is equal to the height H of the gap 51 at the distal end 14 of the device 10. An opening 57 to the receiving space 23 is bound at the proximal end 13 of the device 10 between the teeth 34 and 35 and the tab 54. The opening 57 has a height K.

The tab 54 includes a tongue 55 projecting along the length of the device 10 away from the proximal end 13 of the device 10. The tongue 55 is a rigid projection of the tab 54 and is coplanar with the tab 54. The tongue 55 is parallel to and coplanar with the second extension 46, is parallel to the top span 21, and is transverse with respect to the right and left spans 20 and 22. The tongue 55 extends beyond the teeth 34 and 35, so that the tongue 55 cantilevers out from the tab 54 specifically, and the body 12 generally.

In operation, the device 10 is useful for retaining a strut, such as the strut 11 shown in the various FIGS. in the extended position thereof. Without limiting the device 10, and for purposes merely of describing one of several methods of operation of the device 10, the strut 11 shown in FIGS. 1A and 1B is a strut for holding open a hood of an automobile. Other various types of struts for which the device 10 will be useful will be apparent to one having ordinary skill in the art. The strut 11 moves between extended and retracted positions. When the hood is raised, the strut 11 moves into the extended position, as shown in FIG. 1A, in which a rod 60 of the strut 11 slides out from a cylinder 61 of the strut 11. The rod 60 is secured at one end with a clip to a post 62 that is then fixed to the chassis 63 of the automobile.

When the hood is closed, the strut 11 moves into the retracted position, shown in FIG. 1B, in which the rod 60 slides within the cylinder 61 of the strut 11. The cylinder 61 is secured at one end with a bracket 64 to the underside of the hood. As the strut 11 moves between the extended and retracted positions, the strut 11 pivots on the post 62.

The device 10 is applied to the strut 11. As shown in FIG. 1A, the rod 60 of the strut 11 is fit into the receiving space 23. This is accomplished by first removing the strut 11 from the post 62 according to conventional and well-known means. The strut 11 is extended to the extended position, or beyond, to allow easy manipulation. With the strut 11 free at one end, the device 10 is brought close to the strut 11 and aligned with the strut 11, so that the proximal end 13 of the device 10 is close to the cylinder 61 and the distal end 14 of the device 10 is away from the cylinder 61. The device 10 is arranged so that the outer face 21*a* of the top span 21 is directed upwardly, and the tab 54 is directed downwardly. The rod 60 is then passed into the receiving space 23 until the cylinder 61 is disposed proximate to, or actually against the teeth 34 and 35. The hole 52 is passed over and onto the post 62. For some motor vehicles, the hole 53 of the device 10 is passed over and onto the post 62, depending on the orientation of the post 62. The description herein will refer to the hole 52 for consistency with the understanding that the hole 53 is to be used where the orientation of the post 62 so dictates. Once the hole 52 is fitted over the post 62, the rod 60 is reconnected to the post 62 according to conventional and well-known means. The device 10 is thus installed on the strut 11.

Figure 3A:
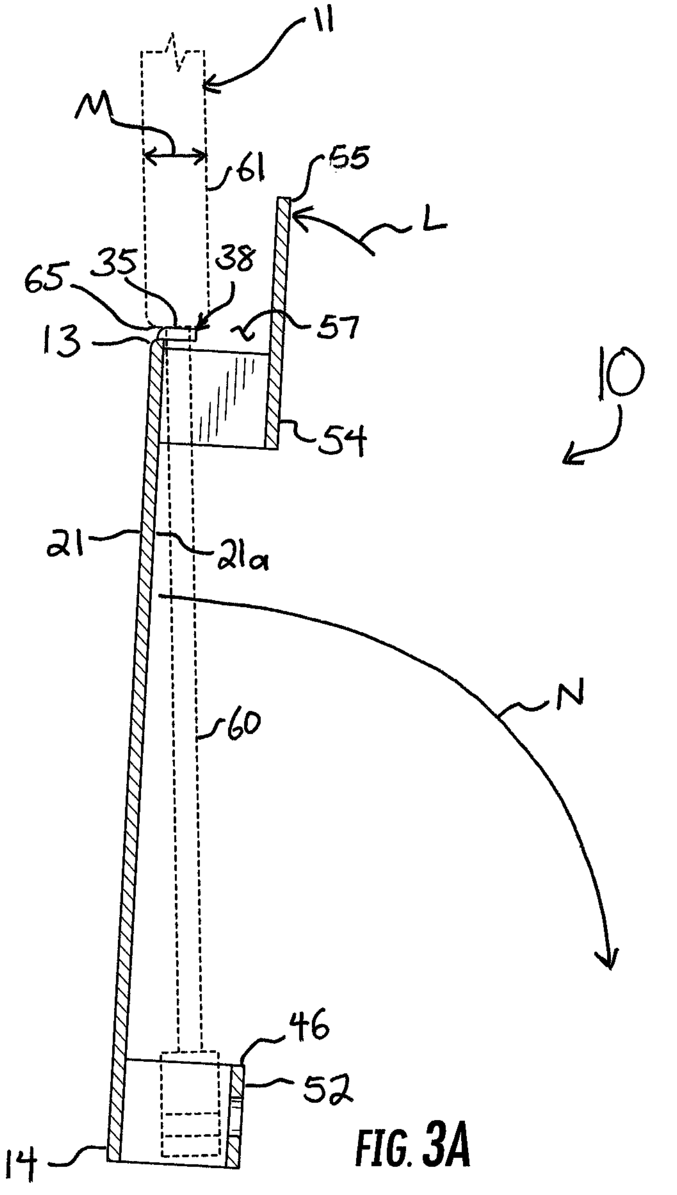
FIGS. 3A and 3B are section views taken along the line 3-3 in FIG. 1A illustrating the strut retention device of FIG. 1 shown in the retention and storage conditions, respectively.

In the extended position of the strut 11, the device 10 is placed into a retention condition. In the extended position of the strut 11, the strut 11 is nearly vertical and the top span 21 rests on the strut 11, as shown in both FIGS. 1A and 3A. As shown in FIG. 3A, the inner face 21*a* of the top span 21 is in contact with the rod 60, thus preventing the device 10 from moving downward with gravity. Further, the rod 60 is disposed, or caught, in the catch 38 defined by the gap 40 between the teeth 34 and 35, thus preventing the device 10 from moving laterally with respect to the strut 11. With the device 10 prevented from downward movement and prevented from lateral movement by the strut 11, the device 10 is fixed on the strut 11. A lower end 65 of the cylinder 61 of the strut 11 rests on top of the teeth 34 and 35, and the teeth 34 and 35 are rigid and unyielding, thereby preventing downward movement, closing, or retracting of the strut 11. Further, the weight of the cylinder 61, and the object the cylinder 61 is supporting (in this description, the hood of a car) produces a normal force on the teeth 34 and 35 which establishes a frictional force between the lower end 65 of the cylinder 61 and the teeth 34 and 35 which resists relative lateral movement of the device 10 and the strut 11. Thus, with the teeth 34 and 35 defining engagement faces beyond which the cylinder 61 cannot move, the device 10 prevents the strut 11 from moving from the extended position to the retracted position.

To allow the strut 11 to move from the extended position to the retracted position thereof, the device 10 must be moved from the retention condition toward the storage condition. When the device 10 is preferably and properly installed on the strut 11 as described above in a top span 21-up, tab 54-down position, the device 10 is moved out of the retention condition by pressing, such as with a user's thumb, the tongue 55 along the arrowed line L shown in FIGS. 1A and 3A, so as to move the device 10 in the direction of line L. The tongue 55 provides a convenient site for applying force to the device 10. The tongue 55 is disposed far from the hole 52, about which the device 10 pivots, and so the tongue 55 is an efficient site for applying force at a long lever arm. An applied force great enough to overcome the force of friction between the teeth 34 and 35 and the lower end 65 of the cylinder 61 causes the device 10 move pivotally with respect to the strut 11, so that the cylinder 61 moves toward the tongue 55.

With continued application of force at the tongue 55 along line L, the device 10 is pivoted until the cylinder 61 is against the tongue 55. When the cylinder 61 is against the tongue 55, the cylinder 61 is disposed briefly above the opening 57 defined at the proximal end 13 of the device 10 between the teeth 34 and 35 and the tab 54. The cylinder 61 has a diameter M, shown in FIG. 1A, which is more than twice the height D of the teeth 34 and 35, and is just less than the height K of the opening 57 of the receiving space 23. Upon the cylinder 61 moving over the opening 57 and free of and away from the teeth 34 and 35, the cylinder 61 is no longer retained, and the strut 11 begins to move automatically from the extended position to the retracted position thereof, with the rod 60 sliding within the cylinder 61, so that the cylinder moves "downwardly" along the device 10 within receiving space from the proximal end 13 to the distal end 14. The weight of the cylinder 61 and the object supported by the cylinder 61 (the hood in this case) causes the strut 11 to close from the extended position to the retracted position. The teeth 34 and 35 slide along the length of the cylinder 61 as the cylinder 61 moves downwardly. The cylinder 61 is contained within the receiving space 23 by the right, top, and left spans 20, 21, and 22; the cylinder 61 is prevented from moving out of the receiving space 23 as the diameter M of the cylinder 61 is greater than the height J of the gap 56. The cylinder 61 is further prevented from moving out of the receiving space 23 by the catch 38 which has a curved shape corresponding to the diameter M of the cylinder 61. The strut 11 moves in pivotal movement from the extended position to the retracted position about the post 62, and the device 10 pivots about the distal end 14 at the post 62 as well, each moving along the line N in FIGS. 1A and 3A. It is noted that the direction of movement of the device 10 and the strut 11 along line N is opposite to that of the direction of the force which must be applied along line L to initially move the device 10 out of the retention condition.

Figure 3B:
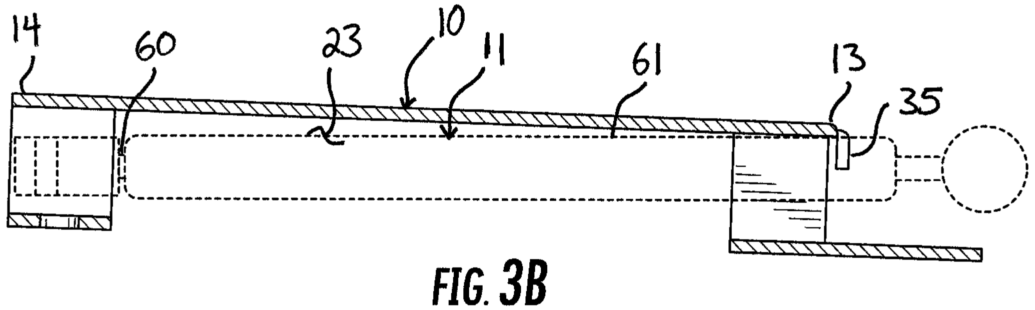

The device 10 and strut 11 thus move to the storage condition and retracted position, respectively, shown in FIGS. 1B and 3B. The strut 11 is received within the receiving space 23 and the cylinder 61 is contained between the proximal and distal ends 13 and 14. In the storage condition of the device 10, the right, top, and left spans 20, 21, and 22 surround the cylinder 61 on three sides and the length of the cylinder 61 is exposed only on a bottom side, which is directed toward the chassis of the motor vehicle.

The strut 11 moves from the retracted position to the extended position, pivoting during such movement, in response to a user causing such extension, such as by lifting the hood. As the strut 11 moves from the retracted position to the extended position and the cylinder 61 and rod 60 extend out, the device 10 slides along the cylinder 61, since the distal end 14 of the device 10 is fixed at the post 62. Gravity urges the device 10 downward onto the strut 11, and the teeth 34 and 35 slide along the cylinder 61 until the cylinder 61 clears the teeth 34 and 35, moving beyond the top 21 and out of the receiving space 23. The contact faces 36 and 37 (not shown in FIG. 3A, but shown in FIG. 2A) are in sliding contact with the cylinder 61 and correspond to the diameter M of the cylinder 61. When the cylinder 61 is out of the receiving space 23, the gap 40 between the teeth 34 and 35 is disposed over the rod 60, and the teeth 34 and 35 are no longer in contact with the cylinder 61, so that the device 10 falls onto the strut 11, with the rod 60 fitting into the gap 40 between the teeth 34 and 35. When the user stops applying upward force to lift the hood, the hood is allowed to settle and the cylinder 61 moves downwardly slightly over the rod 60. When the cylinder 61 moves downwardly, the lower end 65 comes into the contact with the teeth 34 and 35, and the teeth 34 and 35 prevent further downward movement of the cylinder 61, thereby preventing the strut 11 from moving from the extended position back to the retracted position until the user initiates such movement by pressing against the tongue 55 as described above. In this way, the device 10 moves from the storage condition of FIGS. 1B and 3B to the retention condition of FIGS. 1A and 3A in response to the strut 11 moving from the retracted position to the extended position.

Figure 4:
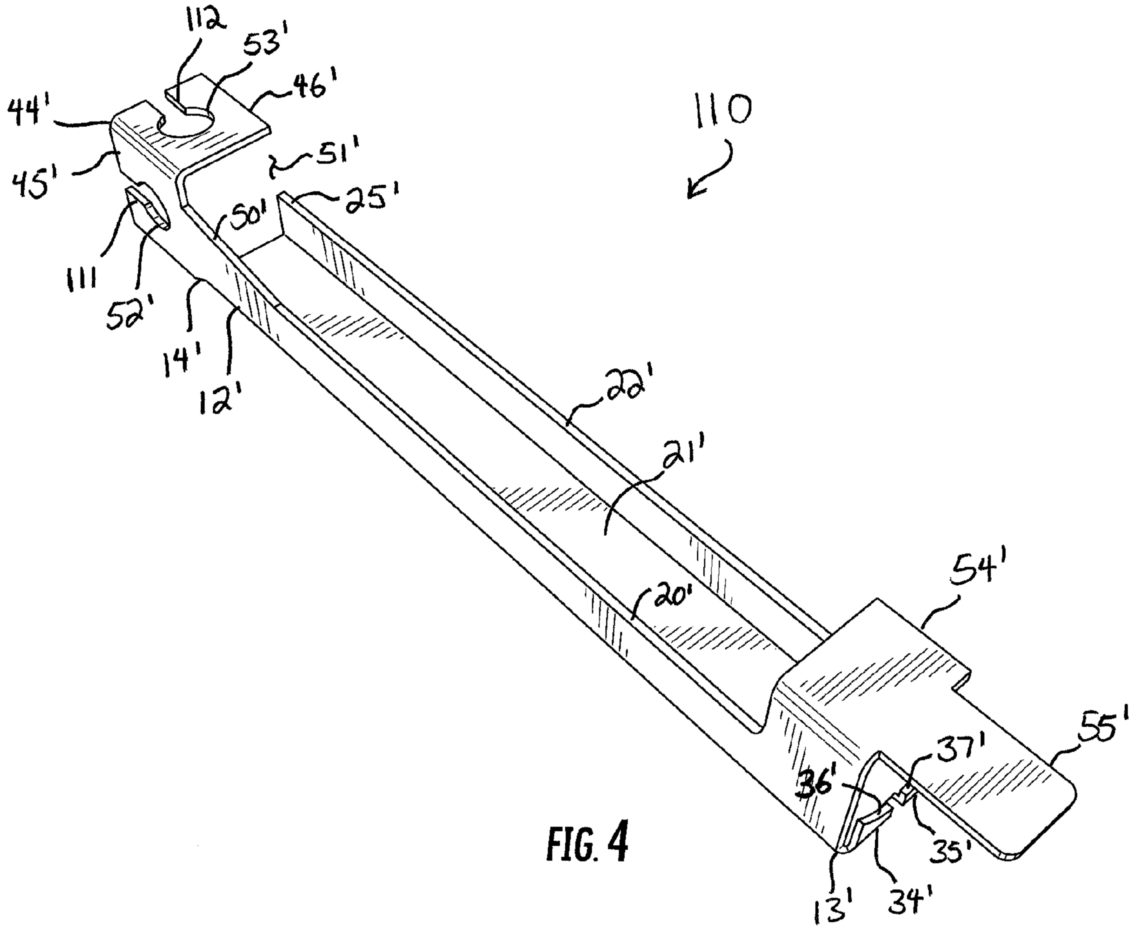
FIG. 4 is a bottom perspective view of an alternate embodiment of a strut retention device.

FIG. 4 illustrates an alternate embodiment of a strut retention device, identified with the reference character 110, which is useful for retaining a strut in an extended position of the strut, and for receiving the strut in a retracted position of the strut. The device 100 is particularly useful for quickly slipping onto and off of a strut, such as a mechanic would do when working on several cars. The strut retention device 100 (hereinafter "device 100") is identical in all aspects, except as noted herein, to the device 10, and as such, the various structural elements and features of the device 100 are identified with the same reference characters used to designate identical structural elements and features of the device 10, but are marked with a prime ("'") symbol so as to distinguish the structural elements and features of the device 100 from those of the device 10. Further, because the device 100 is nearly identical to the device 10, the description of the device 100 will be limited to those structural elements and feature which differ, and one having ordinary skill in the art will readily appreciate that the above description of the device 10 will otherwise be applicable.

The device 100 includes the holes 52' and 53' at the distal end 14'. Slots 111 and 112 are formed entirely through the bracket 44' and are connected to and lead to the holes 52' and 53', respectively. The holes 52' and 53' are thus discontinuous and not complete circles as each is severed by the slot 52' and 53', respectively, leading thereto. The slots 111 and 112 have widths which correspond to the width of the post 62, and which widths are less than the diameter of the holes 52' and 53'. The device 100 can be quickly slipped onto the post 62, by sliding the post 62 through either slot 111 or 112 and then into the hole 52' or 53', respectively. In this way, the device 100 can be applied to the strut 11 without having to remove the strut 11 from the post 62, since the device 100 is interposed between the strut 11 and the post 62. The slots 111 and 112 provide access to the holes 52' and 53', respectively, so that the post 62 can be passed easily into the bracket 44' for quick installation of the device 100 on the strut 11.

A preferred embodiment is fully and clearly described above so as to enable one having skill in the art to understand, make, and use the same. Those skilled in the art will recognize that modifications may be made to the described embodiment without departing from the spirit of the invention. To the extent that such modifications do not depart from the spirit of the invention, they are intended to be included within the scope thereof.

The invention claimed is:

1. A device for retaining a strut having opposing first and second portions, the first portion being slidably movable with respect to the second portion, wherein the strut moves between a retracted position and an extended position, the device comprising:

an elongate body having opposed first and second ends, wherein the elongate body is movable with respect to the strut about a pivot formed adjacent the first end between a storage condition and a retention condition, in which the strut is prevented from moving from the extended position to the retracted position thereof;

a catch on the elongate body, wherein the catch extends transverse from the second end of the elongate body toward the strut; and the elongate body moves from the storage condition to the retention condition in response to extension of the second portion of the strut beyond the catch.

2. The device of claim 1, wherein in the retention condition, the catch contacts the strut to prevent the strut from moving from the extended position to the retracted position thereof.

3. The device of claim 2, wherein the catch comprises two teeth separated by a gap which receives the strut in the extended position thereof.

4. The device of claim 1, wherein the pivot is a hole formed through the elongate body, transverse to the elongate body.

5. The device of claim 4, wherein a slot through the elongate body is connected to the hole to define the hole as a discontinuous hole.

6. The device of claim 1, wherein the first end of the elongate body is fixed with respect to the strut.

7. The device of claim 1, wherein:

the catch comprises a tooth and a gap proximate to the tooth; and in the retention condition, the strut is positioned against the tooth and through the gap.

8. The device of claim 1, further comprising:

a receiving space defined within the elongate body, wherein;

in the storage condition, the elongate body receives the strut within the receiving space; and in the retention condition, the elongate body prevents the strut from moving from the extended position to the retracted position.

9. The device of claim 8, wherein:

the first end of the elongate body is fixed; and the elongate body pivots about the first end during movement between the storage and retention conditions.

10. The device of claim 8, further comprising two teeth separated by a gap which receives the strut in the extended position thereof.

11. The device of claim 8, wherein in the retention condition, the catch is received in contact against the strut to prevent the strut from moving from the extended position to the retracted position.

12. The device of claim 11, wherein:

the catch comprises a tooth and a gap proximate to the tooth; and in the retention condition, the strut is positioned against the tooth and through the gap.

13. The device of claim 8, wherein:

movement of the elongate body from the retention condition to the storage condition occurs in a first direction; and movement of the elongate body from the retention condition to the storage condition is initiated by first moving the elongate body in a second direction;

wherein the first direction is opposite to the second direction.

* * * * *